(12) United States Patent
Ohhashi et al.

(10) Patent No.: US 11,664,520 B2
(45) Date of Patent: May 30, 2023

(54) FUEL CELL ASSEMBLY AND VEHICLE INCLUDING FUEL CELL ASSEMBLY

(71) Applicants: TOYOTA JIDOSHA KABUSHIKI KAISHA, Toyota (JP); HINO MOTORS, LTD., Hino (JP)

(72) Inventors: Yasuhiko Ohhashi, Toyota (JP); Hiroshi Yamagata, Toyota (JP); Yuta Komatsu, Toyota (JP); Kohei Hamano, Toyota (JP)

(73) Assignees: TOYOTA JIDOSHA KABUSHIKI KAISHA, Toyota (JP); HINO MOTORS, LTD., Hino (JP)

( * ) Notice: Subject to any disclaimer, the term of this patent is extended or adjusted under 35 U.S.C. 154(b) by 176 days.

(21) Appl. No.: 17/174,685

(22) Filed: Feb. 12, 2021

(65) Prior Publication Data

US 2021/0257647 A1    Aug. 19, 2021

(30) Foreign Application Priority Data

Feb. 13, 2020   (JP) .............................. JP2020-022104

(51) Int. Cl.
*B60K 1/04*    (2019.01)
*H01M 8/2475*    (2016.01)

(52) U.S. Cl.
CPC ............. *H01M 8/2475* (2013.01); *B60K 1/04* (2013.01); *B60K 2001/045* (2013.01)

(58) Field of Classification Search
CPC .... H01M 8/2475; H01M 8/0273; H01M 8/00; H01M 8/2465; H01M 8/249; H01M 8/24; H01M 2250/20; B60K 1/04; B60K 1/00; B60K 2001/045; B60K 2001/0411; B60K 2001/0405; B60Y 2200/14; B60Y 2200/142; B60L 50/71; B60L 50/00; B60L 50/70; B60L 50/50; B60L 50/72
See application file for complete search history.

(56) References Cited

U.S. PATENT DOCUMENTS

| | | | | |
|---|---|---|---|---|
| 6,648,085 | B2* | 11/2003 | Nagura ............... | H01M 8/0625 180/68.5 |
| 6,938,712 | B2* | 9/2005 | Chernoff ............... | B60W 30/18 180/65.265 |
| 6,974,646 | B2* | 12/2005 | Noetzel ............... | H01M 8/2432 429/492 |
| 7,222,692 | B2* | 5/2007 | Masuda ................... | B60K 1/00 180/312 |

(Continued)

FOREIGN PATENT DOCUMENTS

| JP | 2004042828 A | 2/2004 |
|---|---|---|
| JP | 4686362 B2 | 5/2011 |

(Continued)

*Primary Examiner* — James M Dolak
(74) *Attorney, Agent, or Firm* — Hunton Andrews Kurth LLP

(57) ABSTRACT

A fuel cell assembly is mounted on a vehicle via a mounting portion. The fuel cell assembly includes a first fuel cell unit, a first frame portion on which the first fuel cell unit is mounted and fixed, a second fuel cell unit, a second frame portion on which the second fuel cell unit is mounted and fixed, and a connecting portion that connects the first frame portion and the second frame portion such that the second fuel cell unit is located above the first fuel cell unit.

3 Claims, 6 Drawing Sheets

(56) References Cited

U.S. PATENT DOCUMENTS

| | | | | |
|---|---|---|---|---|
| 7,530,414 B2* | 5/2009 | Kubusch | ............... | B60L 58/33 |
| | | | | 903/908 |
| 7,641,017 B2* | 1/2010 | Nozaki | ............... | B60K 15/063 |
| | | | | 180/291 |
| 7,726,429 B2* | 6/2010 | Suzuki | ............... | B62D 21/152 |
| | | | | 180/232 |
| 7,906,241 B2* | 3/2011 | Kusano | ............. | H01M 8/04141 |
| | | | | 429/456 |
| 7,914,942 B2* | 3/2011 | Kato | ............... | B62D 25/2036 |
| | | | | 429/512 |
| 8,048,575 B2* | 11/2011 | Kusano | ............. | H01M 8/04141 |
| | | | | 429/456 |
| 8,413,751 B2* | 4/2013 | Jufuku | ............... | H01M 8/247 |
| | | | | 180/68.5 |
| 8,459,399 B2* | 6/2013 | Ohashi | ............... | B60L 7/16 |
| | | | | 180/312 |
| 9,079,508 B2* | 7/2015 | Naito | ............... | B60L 1/003 |
| 9,260,034 B2* | 2/2016 | Naito | ............... | B60L 3/0007 |
| 9,283,838 B2* | 3/2016 | Ohashi | ............... | B60L 58/40 |
| 9,371,009 B2* | 6/2016 | Ishikawa | ............. | H01M 8/2457 |
| 9,537,159 B2* | 1/2017 | Jufuku | ............... | B60K 1/04 |
| 9,937,780 B2* | 4/2018 | Murata | ............... | B60K 1/04 |
| 9,981,693 B2* | 5/2018 | Murata | ............... | B60K 1/04 |
| 10,384,544 B2* | 8/2019 | Sekine | ............... | B60L 50/71 |
| 10,518,620 B2* | 12/2019 | Yamafuji | ............. | B60K 1/04 |
| 11,367,882 B2* | 6/2022 | Yoshitomi | ........... | H01M 8/2465 |
| 11,502,324 B2* | 11/2022 | Yoshitomi | ............... | B60K 1/00 |
| 2003/0070858 A1* | 4/2003 | Kondo | ............... | B60L 50/71 |
| | | | | 180/291 |
| 2003/0108784 A1* | 6/2003 | Enjoji | ............... | H01M 8/02 |
| | | | | 429/468 |
| 2007/0122669 A1 | 5/2007 | Kusano et al. | | |
| 2014/0335434 A1 | 11/2014 | Ikeya et al. | | |

FOREIGN PATENT DOCUMENTS

| | | |
|---|---|---|
| JP | 2013154691 A | 8/2013 |
| JP | 2017128202 A | 7/2017 |

* cited by examiner

FUEL CELL ASSEMBLY AND VEHICLE INCLUDING FUEL CELL ASSEMBLY

INCORPORATION BY REFERENCE

The disclosure of Japanese Patent Application No. 2020-022104 filed on Feb. 13, 2020 including the specification, drawings and abstract is incorporated herein by reference in its entirety.

BACKGROUND

1. Technical Field

The present disclosure relates to a fuel cell assembly and a vehicle including the fuel cell assembly.

2. Description of Related Art

A fuel cell vehicle may be equipped with a plurality of fuel cell units. For example, Japanese Patent No. 4686362 (JP 4686362 B) below discloses a fuel cell vehicle in which two fuel cell stacks corresponding to fuel cell units are disposed side by side in a width direction of a vehicle.

SUMMARY

In a fuel cell vehicle, the fuel cell units are usually fixed to a frame of the fuel cell vehicle via a mounting portion including an elastic buffer member that absorbs vibrations and impacts transmitted from a vehicle body by elastic deformation. In this case, the fuel cell units may be displaced due to the elastic deformation of the elastic buffer member in the mounting portion. Therefore, in the fuel cell vehicle, in order to suppress interference between the fuel cell unit and its surrounding structures, it is desirable to provide a sufficient clearance around the fuel cell unit so as to allow displacement of the fuel cell unit. Further, in the fuel cell vehicle, typically, it is desirable to provide a clearance around the fuel cell unit to facilitate operations such as assembly and maintenance work of the fuel cell unit.

In the case where the plurality of fuel cell units are disposed in a row in a width direction and mounted on the fuel cell vehicle as in JP 4686362 B, the dimension in the width direction of the vehicle may need to be increased when an attempt is made to secure a clearance around each fuel cell unit. As described above, there is still room for improvement regarding a method of mounting the fuel cell units in a limited space in the vehicle.

The technology of the present disclosure can be implemented as the following aspect.

A first aspect of the present disclosure provides a fuel cell assembly mounted on a vehicle via a mounting portion. The fuel cell assembly includes: a first fuel cell unit; a first frame portion on which the first fuel cell unit is placed and fixed; a second fuel cell unit; a second frame portion on which the second fuel cell unit is placed and fixed; and a connecting portion configured to connect the first frame portion and the second frame portion such that the second fuel cell unit is located above the first fuel cell unit. In the fuel cell assembly according to the first aspect, the first fuel cell unit and the second fuel cell unit can be integrally and collectively mounted on the vehicle via the common mounting portion, which is effective. Further, in the fuel cell assembly according to the first aspect, the first fuel cell unit and the second fuel cell unit are supported at the positions displaced from each other in the height direction. Therefore, a clearance can be easily provided in areas in front of, at the rear of, and on the right and left of each fuel cell unit so as to allow displacement of the fuel cell unit by the mounting portion and to facilitate maintenance work.

In the fuel cell assembly according to the first aspect, the first fuel cell unit and the second fuel cell unit may be disposed at positions offset from each other in a front-rear direction of the vehicle. In the fuel cell assembly according to the first aspect, the fuel cell units can be fixed at the positions offset from each other in the front-rear direction. With this configuration, auxiliary machines, etc., connected to the fuel cell units can be installed in the space provided by offsetting the fuel cell units from each other. Therefore, a limited space in the vehicle can be efficiently used.

In the fuel cell assembly according to the first aspect, the second frame portion may be provided at a position above and away from the mounting portion, and a strength of members constituting the second frame portion may be lower than a strength of members constituting the first frame portion. With the support frame according to the first aspect, the mounting portion is connected to the fuel cell assembly at a position away from the second frame portion. With this configuration, the impact when a vehicle collision occurs is suppressed from being directly transmitted to the second frame portion. Therefore, the strength of the second frame portion is allowed to be lowered with respect to that of the first frame portion disposed below the second frame portion together with the mounting portion. When the strength of the second frame portion is lowered, the weight of the second frame portion can be easily reduced. Therefore, the weight of the support frame as a whole can be reduced.

In the fuel cell assembly according to the first aspect, the first fuel cell unit and the second fuel cell unit may be supported so as to have portions that overlap each other when viewed in a height direction of the vehicle. With the fuel cell assembly according to the first aspect, the plurality of fuel cell units can be integrally and compactly mounted in the limited space inside the vehicle, and enlargement of the vehicle in the front-rear direction and in the width direction can be suppressed.

A second aspect of the present disclosure provides a vehicle including the fuel cell assembly according to the first aspect. The vehicle is configured as a freight vehicle in which cargo is loaded behind a vehicle cabin in which a driver is on board, and the fuel cell assembly is installed in an area below the vehicle cabin.

In the vehicle according to the second aspect, the plurality of fuel cell units can be mounted in two stages, that is, upper and lower stages, by utilizing a space in the freight vehicle that can be easily dimensioned in the height direction.

The technique of the present disclosure can also be realized in various forms other than the fuel cell assembly and the vehicle equipped with the fuel cell assembly. For example, the technique of the present disclosure can be realized in a form of a support frame that supports the fuel cell units, a method of mounting the fuel cell unit on a vehicle, or a mounting structure of the fuel cell unit in the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Embodiment

Figure 1:
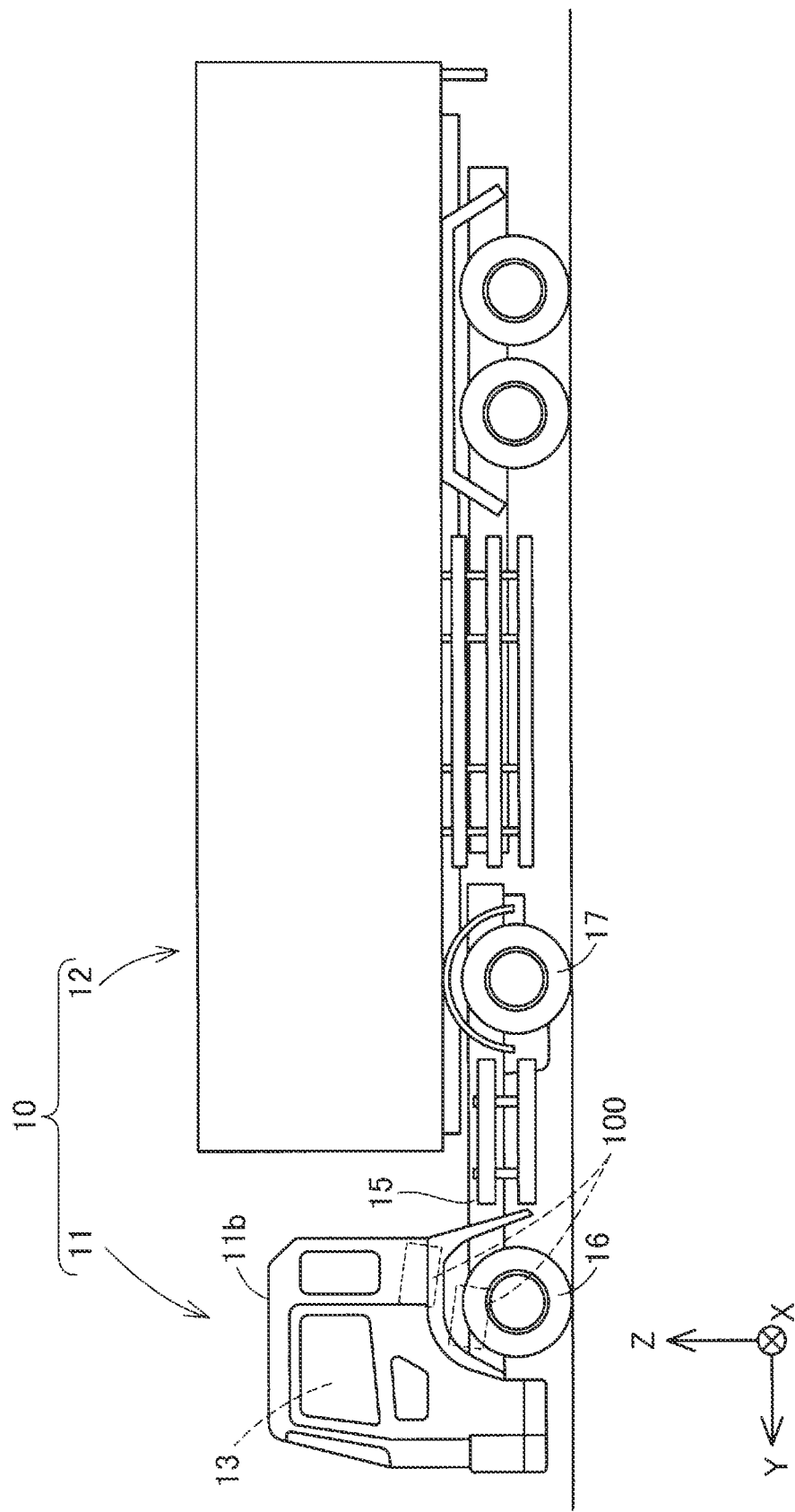
FIG. 1 is a schematic side view showing a vehicle.

FIG. 1 is a schematic side view showing a vehicle 10 according to an embodiment. In FIG. 1, arrows indicating an X direction, a Y direction, and a Z direction that are orthogonal to each other are illustrated. The X direction corresponds to a width direction of the vehicle 10, the Y direction corresponds to a front-rear direction of the vehicle 10, and the Z direction corresponds to a height direction of the vehicle 10. The arrows indicating the X direction, the Y direction, and the Z direction are illustrated in each of the drawings to be referred later so as to correspond to FIG. 1.

The vehicle 10 is a fuel cell vehicle including a fuel cell as an electric power source. In the embodiment, the vehicle 10 includes a plurality of fuel cell units 100. In the present specification, the "fuel cell unit" means a unit composed of a fuel cell and a device integrally attached to a fuel cell body. The "devices integrally attached to the fuel cell body" include, for example, a case that accommodates the fuel cell, sensors, valves, pumps, and pipe connecting members.

The fuel cell according to the embodiment is a polymer electrolyte fuel cell, and as will be described later, it is configured as a fuel cell stack in which a plurality of single cells, which are elements capable of generating electric powers as a single cell, are stacked. The fuel cell included in the fuel cell unit 100 is not limited to the polymer electrolyte fuel cell. In other embodiments, various types of fuel cells, such as a solid oxide fuel cell, can be used as the fuel cell.

In the embodiment, the vehicle 10 is configured as a freight vehicle and includes a tractor head 11 that is a towing vehicle and a trailer 12 that is a towed vehicle on which cargo is loaded. The tractor head 11 includes a vehicle cabin 13 inside a main body 11b. Occupants including a driver are on board in the vehicle cabin 13. Further, the tractor head 11 includes a pair of vehicle frames 15 that constitute side frames arranged in the X direction. Each of the vehicle frames 15 is disposed along the Y direction and extends from an area below the vehicle cabin 13 rearward of the main body 11b along the Y direction. The fuel cell units 100 described above are supported by a support frame that will be described later, and are integrally fixed to the vehicle frames 15 of the vehicle 10 as a fuel cell assembly. A method of mounting the fuel cell units 100 in the vehicle 10 will be described later.

Front wheels 16 and rear wheels 17 of the tractor head 11 are attached to outer sides of the vehicle frames 15 in the X direction. The front wheels 16 are located under the vehicle cabin 13, and the rear wheels 17 are located near rear end portions of the vehicle frames 15. The front wheels 16 are drive wheels that are connected to a driving force source (not shown) and are rotated by a driving force transmitted from the driving force source. In the embodiment, the driving force source is composed of a motor and is driven by an output power of the fuel cell units 100. Front end portions of a luggage compartment of the trailer 12 are disposed above the rear wheels 17.

Figure 2:
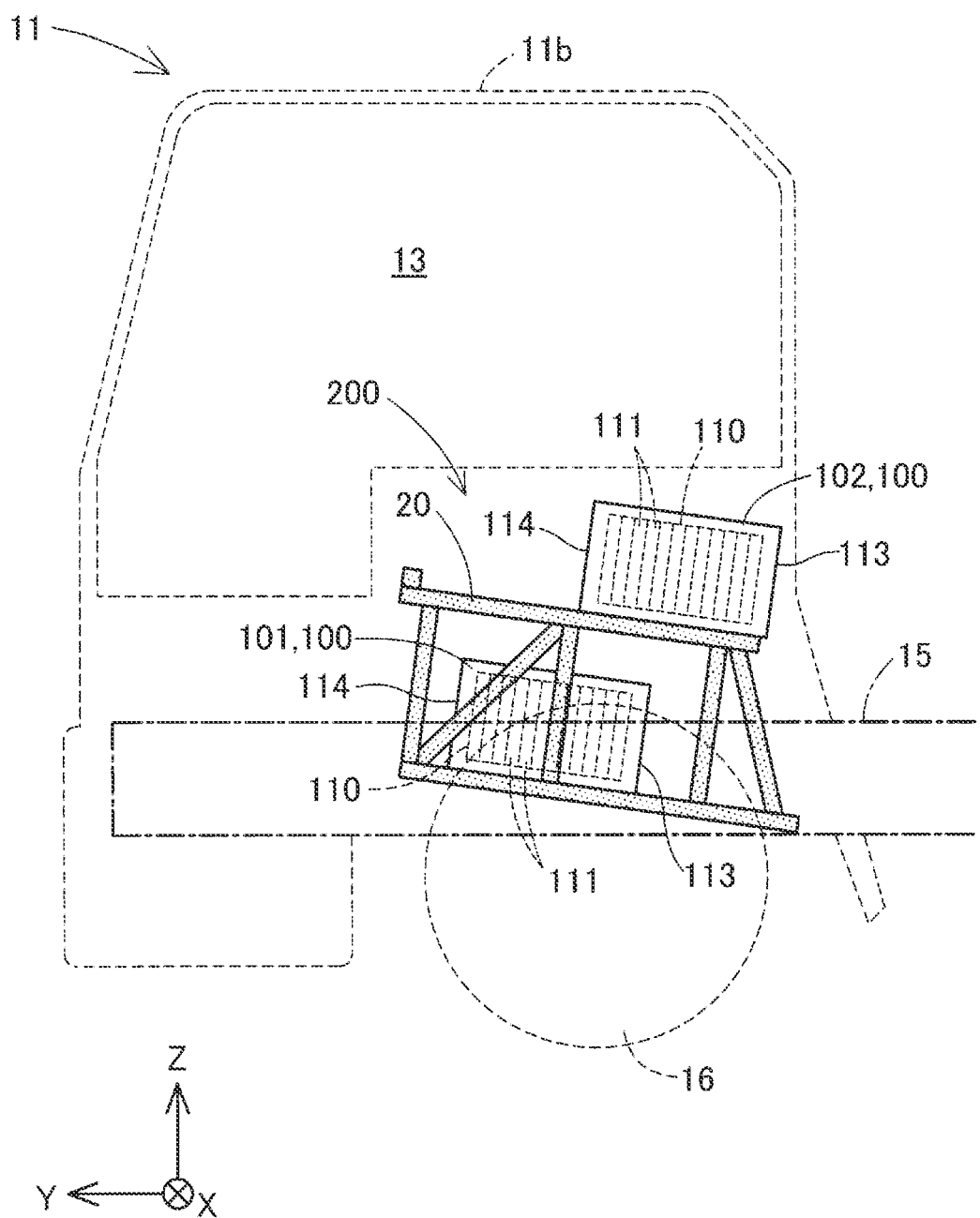
FIG. 2 is a schematic view showing an installation position of a support frame.

FIG. 2 is a schematic view showing an installation position of a fuel cell assembly 200 in the tractor head 11 and fuel cell stacks 110 included in the fuel cell units 100. In FIG. 2, for convenience, an outer peripheral contour line of the main body 11b and an area where the vehicle cabin 13 is provided in the main body 11b when the tractor head 11 is viewed in the X direction are shown by broken lines, and the vehicle frame 15 of the tractor head 11 is shown by long dashed short dashed lines. Further, in FIG. 2, the fuel cell stack 110 is shown by broken lines.

In the embodiment, the fuel cell units 100 include a first fuel cell unit 101 and a second fuel cell unit 102. The first fuel cell unit 101 and the second fuel cell unit 102 constitute the fuel cell assembly 200 by being supported by a common support frame 20. Although the details will be described later, in the fuel cell assembly 200, the first fuel cell unit 101 and the second fuel cell unit 102 are supported by the support frame 20 in two stages, that is, upper and lower stages. The first fuel cell unit 101 is disposed in the lower stage, and the second fuel cell unit 102 is disposed in the upper stage.

The fuel cell assembly 200 is mounted on the vehicle 10 by fixing the support frame 20 to the vehicle frames 15 via mounting portions that will be described later. In FIG. 2, for convenience, illustration of the mounting portions is omitted. In the embodiment, the fuel cell assembly 200 is disposed below the vehicle cabin 13 between the vehicle frames 15. Further, the fuel cell assembly 200 is disposed at a position sandwiched between the front wheels 16 in the X direction.

In the embodiment, the support frame 20 of the fuel cell assembly 200 is installed in a state where the support frame 20 is slightly inclined with respect to the Y direction such that a rear side of the support frame 20 is declined downward. The support frame 20 is installed, for example, in a state where the support frame 20 is inclined by about 1 to 10 degrees with respect to the Y direction. With this configuration, the first fuel cell unit 101 and the second fuel cell unit 102 supported by the support frame 20 are disposed in the vehicle 10 in a state where the first fuel cell unit 101 and the second fuel cell unit 102 are inclined with respect to the Y direction such that the rear sides are declined downward. In another embodiment, the support frame 20 may not be installed in an inclined state with respect to the Y direction.

Each of the first fuel cell unit 101 and the second fuel cell unit 102 includes a fuel cell stack 110 in which a plurality of single cells 111 is stacked. Although not shown, each single cell 111 includes a membrane electrode assembly in which electrodes are disposed on respective sides of the solid electrolyte membrane. The fuel cell stack 110 of each of the fuel cell units 101, 102 is disposed such that one end of the single cell 111 in a stacking direction is located on the front side of the vehicle 10 and the other end is located on the rear side of the vehicle 10. A first pipe connecting portion 113 is provided at a rear end portion of the fuel cell stack 110. A pipe for supplying and discharging a reaction gas to and from the fuel cell stack 110 is connected to the first pipe connecting portion 113. Further, a second pipe connecting portion 114 is provided at a front end portion of the fuel cell stack 110. A pipe for supplying and discharging coolant to and from the fuel cell stack 110 is connected to the second pipe connecting portion 114.

As described above, the support frame 20 is installed so as to be inclined with respect to the Y direction. Therefore, the fuel cell stack 110 is disposed in a state where the fuel cell stack 110 is inclined with respect to the Y direction such that the rear end side is declined downward. With this configuration, water generated through power generation in the fuel cell stack 110 is easily guided to the rear end portion of the fuel cell stack 110 by the action of gravity. Therefore, drainage from the fuel cell stack 110 through the first pipe connecting portion 113 is facilitated.

Figure 3:
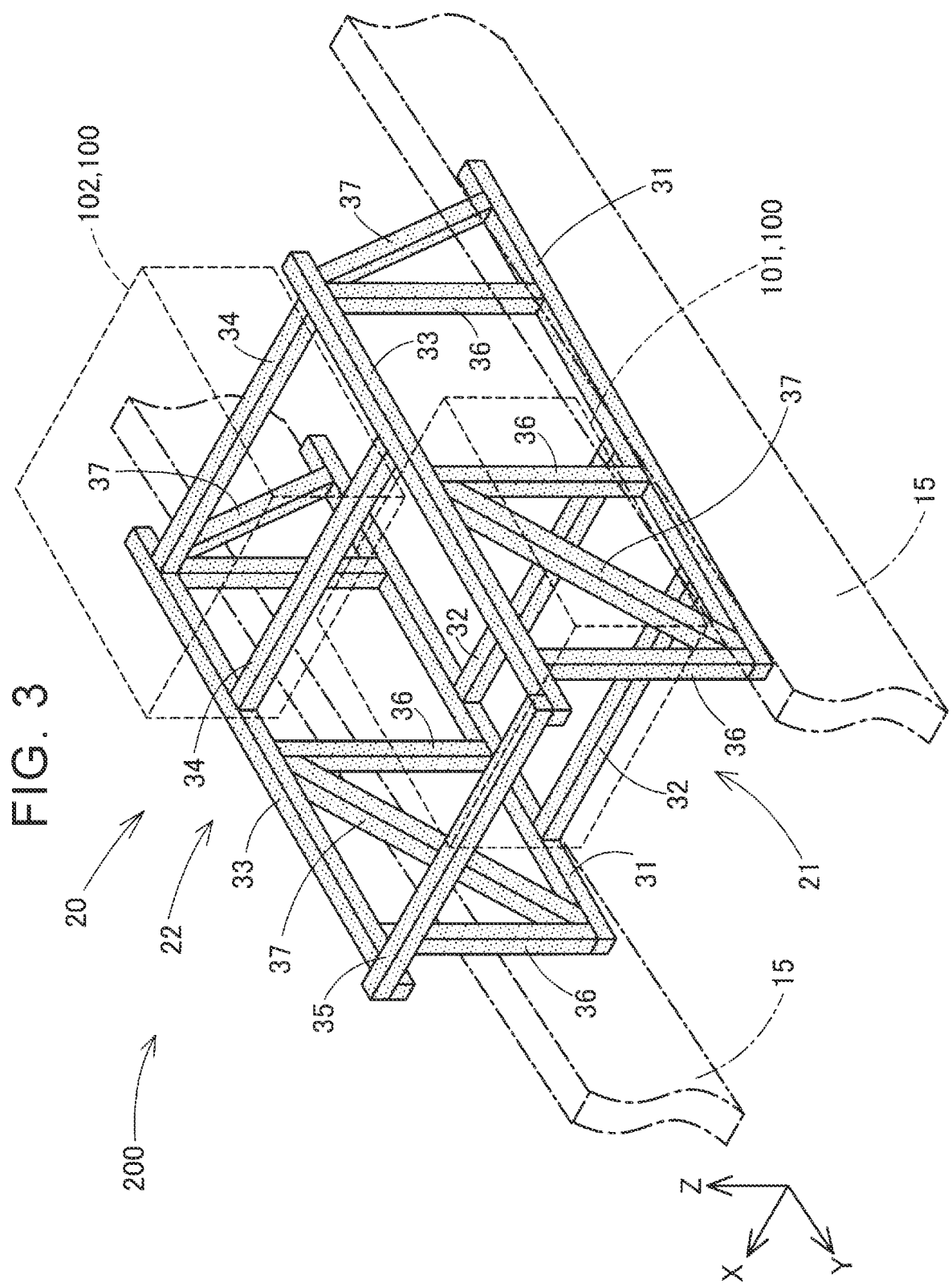
FIG. 3 is a schematic perspective view of the support frame.
Figure 4:
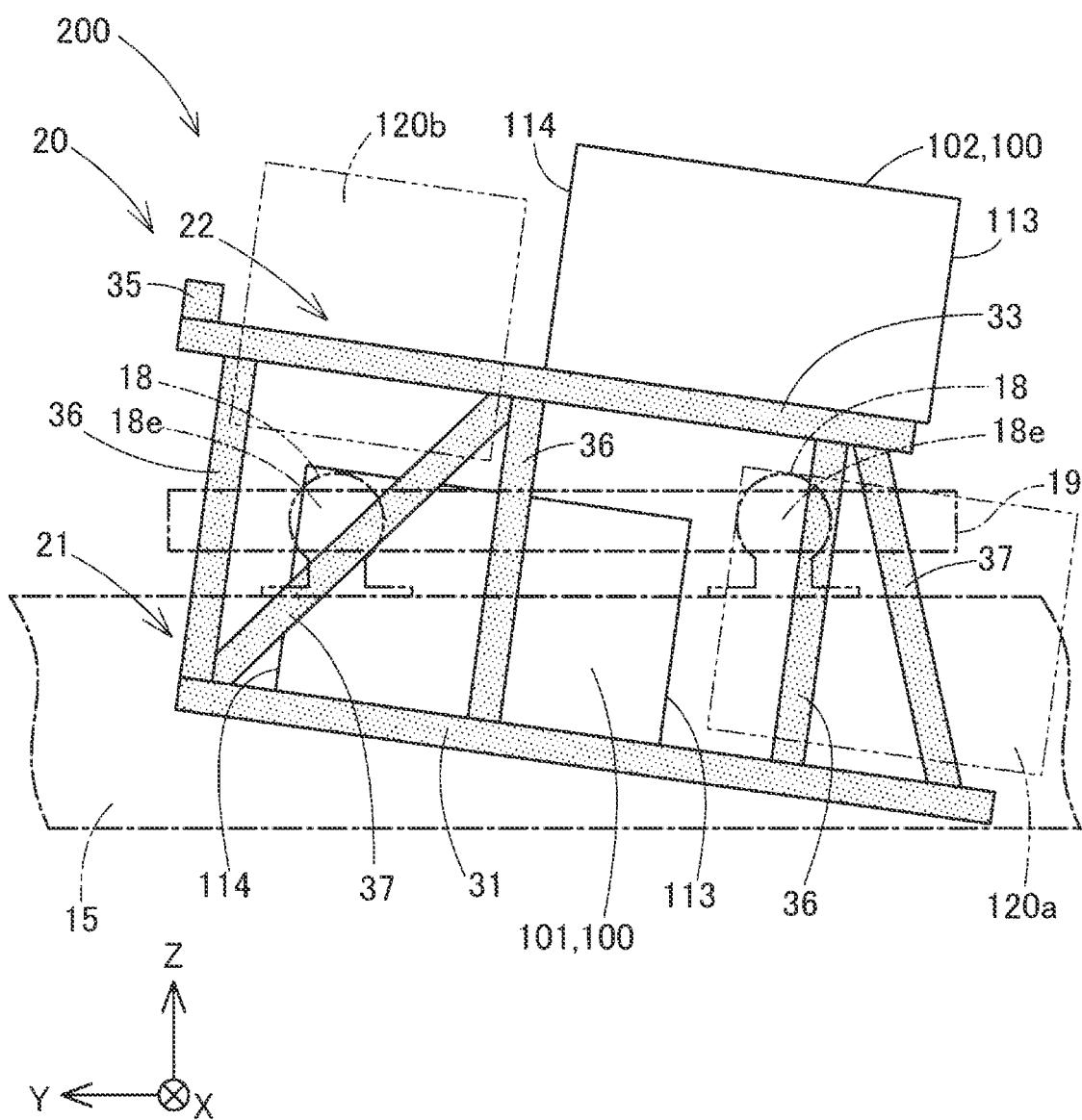
FIG. 4 is a schematic side view of the support frame.
Figure 5:
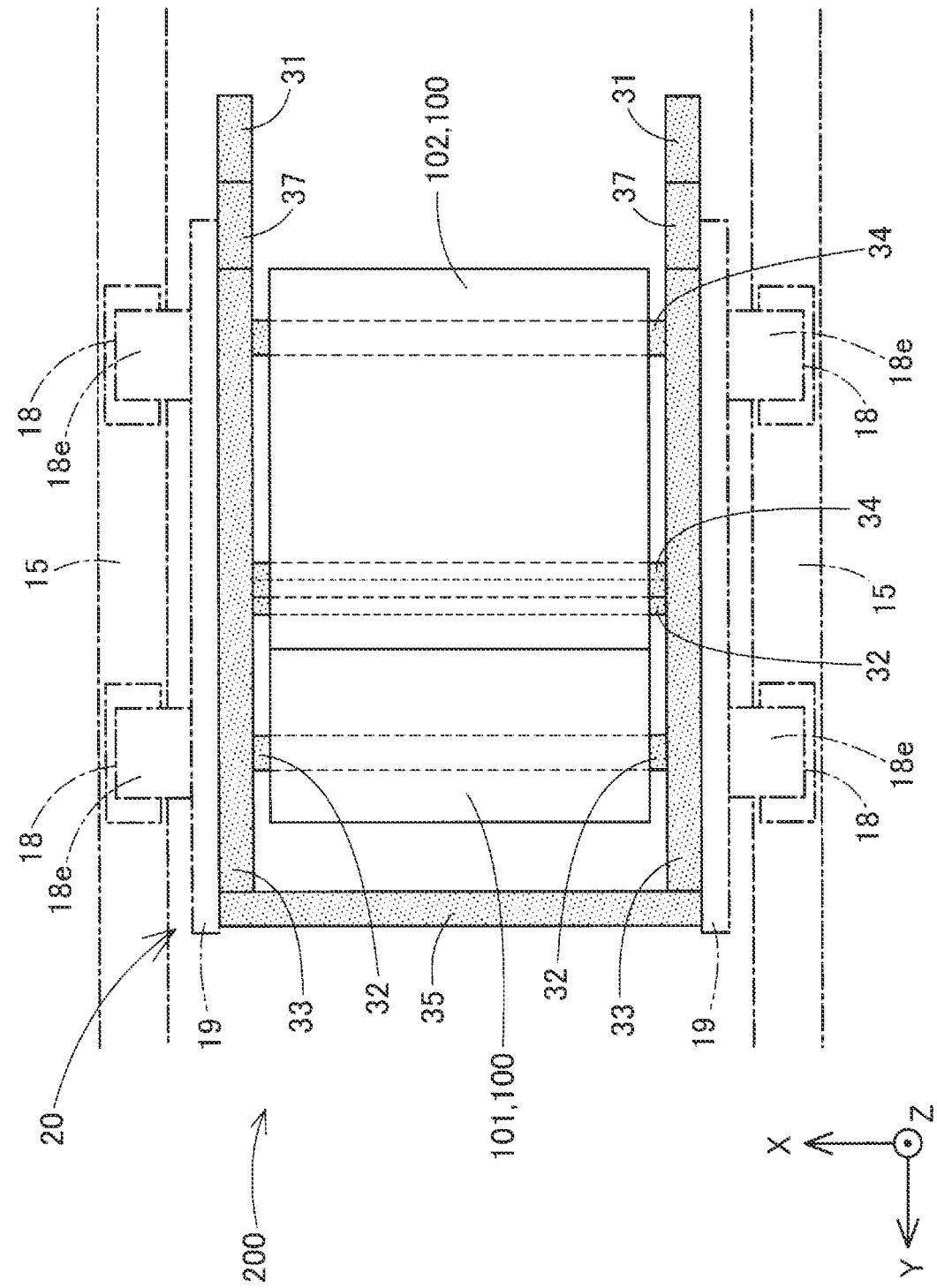
FIG. 5 is a schematic plan view of the support frame.
Figure 6:
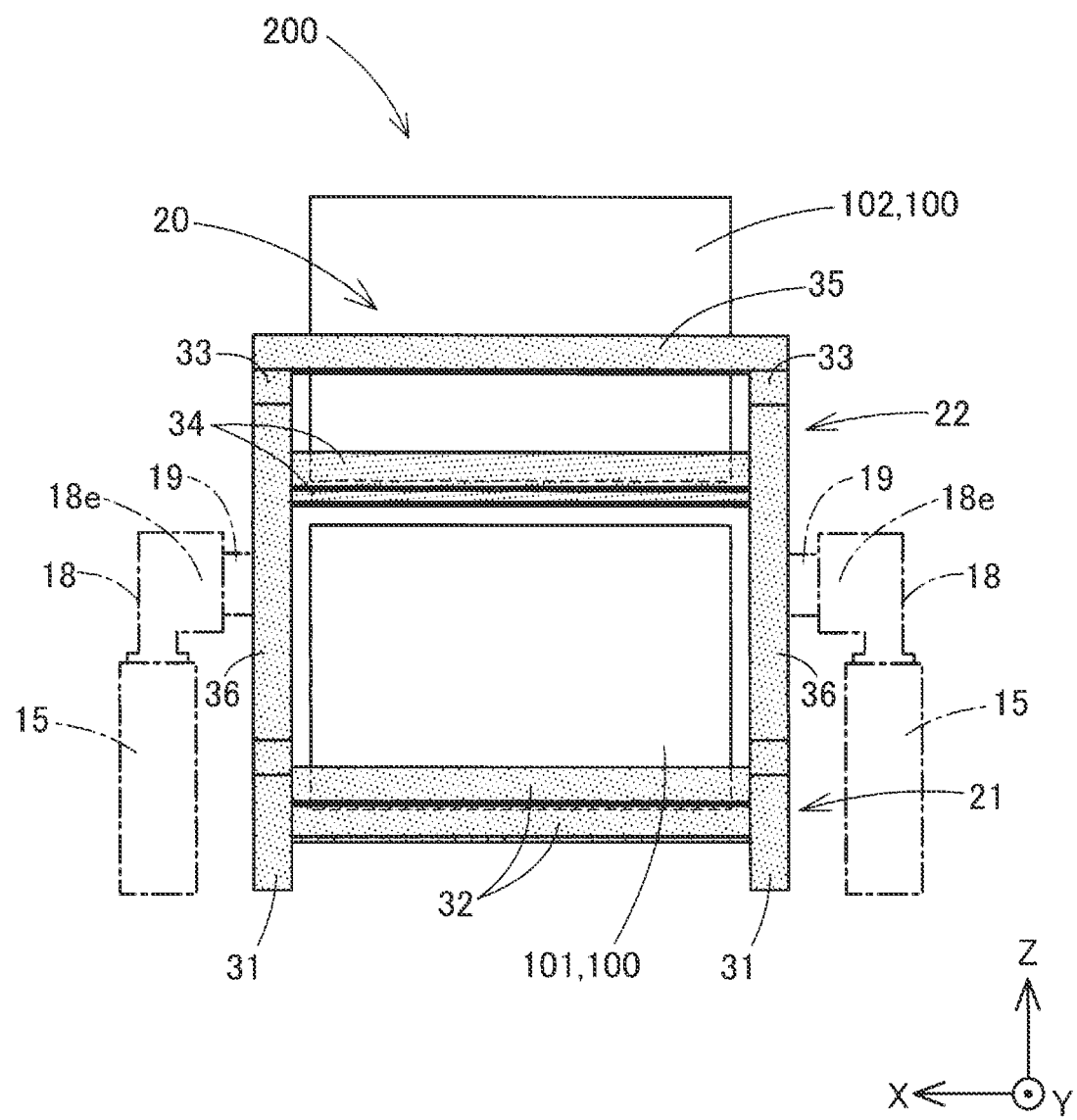
FIG. 6 is a schematic front view of the support frame.

The configuration of the support frame 20 included in the fuel cell assembly 200 will be described in detail with reference to FIGS. 3, 4, 5, and 6. FIG. 3 is a schematic perspective view of the support frame 20 in a used state where the support frame 20 is fixed to the vehicle frames 15 of the vehicle 10 when viewed from diagonally above. FIG. 4 is a schematic side view of the support frame 20 in a used state when viewed in the X direction. FIG. 5 is a schematic plan view of the support frame 20 in a used state when viewed from above to below in a direction opposite to the Z direction. FIG. 6 is a schematic plan view of the support frame 20 in a used state when viewed from the front side to the rear side in a direction opposite to the Y direction.

In FIGS. 3 to 6, the vehicle frames 15 are shown by long dashed short dashed lines for convenience. Further, in FIGS. 4 to 6, in addition to the vehicle frames 15, mounting portions 18 for fixing the support frame 20 to the vehicle frames 15 and connecting members 19 are also shown by long dashed short dashed lines. In FIG. 3, the fuel cell units 100 are shown by broken lines, and the mounting portions 18 and the connecting members 19 are not shown. Further, in FIG. 4, areas for mounting system auxiliary machines 120a, 120b, which will be described later, are shown by long dashed double-short dashed line.

Now, FIG. 3 is referred. The support frame 20 is configured as a substantially rectangular parallelepiped frame body in which a plurality of elongated linear frame members 31 to 37 are connected. In the embodiment, each of the frame members 31 to 37 is composed of a hollow prismatic metal member. Each of the frame members 31 to 37 may have a round columnar shape or an elongated flat plate shape instead of a prismatic shape, and may be configured as an angle member having a section orthogonal to a longitudinal direction being a substantially L-shaped or a rectangular wave shape. The frame members 31 to 37 are manufactured, for example, by extrusion molding and are connected to each other by welding.

The support frame 20 includes a first frame portion 21 on which the first fuel cell unit 101 is mounted and fixed, and a second frame portion 22 on which the second fuel cell unit 102 is mounted and fixed. The second frame portion 22 is provided above the first frame portion 21 such that the second fuel cell unit 102 is located above the first fuel cell unit 101. Note that, "above" indicates a direction including a direction opposite to the direction of gravity.

As shown in FIG. 3, in the first frame portion 21, a mounting surface of the first fuel cell unit 101 is configured by a pair of first frame members 31 disposed in parallel to each other and a plurality of second frame members 32 intersecting the first frame members 31. The first frame members 31 serve as the base of the support frame 20 and are arranged apart from each other in the X direction in the vehicle 10. As shown in FIG. 5, the first frame members 31 are disposed in parallel to each other. As shown in FIGS. 3 to 6, each of the first frame members 31 is disposed along the vehicle frame 15 at a position adjacent to the vehicle frame 15 in the X direction in the vehicle 10. Further, as shown in FIGS. 3 and 4, each of the first frame members 31 is disposed in the vehicle 10 so as to be inclined with respect to the Y direction such that the first frame member 31 is declined toward the rear side.

As shown in FIGS. 3, 5, and 6, the second frame members 32 are disposed to bridge between the first frame members 31 in the X direction, and both ends are connected to the respective side surfaces of the first frame members 31. As shown in FIGS. 3 and 5, in the embodiment, the second frame members 32 are provided at positions closer to the front sides of the first frame members 31. As shown in FIG. 3, the first fuel cell unit 101 is disposed on the second frame member 32, and is fixed to the second frame members 32 by bolts, etc., via a battery mount (not shown). The second frame members 32 function as first fixing portions to which the first fuel cell unit 101 is fixed in the support frame 20.

As shown in FIG. 3, in the second frame portion 22, a mounting surface of the second fuel cell unit 102 is configured by a pair of third frame members 33 disposed in parallel to each other and a plurality of fourth frame members 34 intersecting the third frame members 33. The third frame members 33 serve as the upper sides of the support frame 20, and are arranged apart from each other in the X direction and in parallel to each other along a substantially Y direction in the vehicle 10. As shown in FIG. 5, each of the third frame members 33 is disposed parallel to the first frame member 31 at a position where the third frame member 33 overlaps with the first frame member 31 when viewed in the Z direction. As shown in FIGS. 3 and 4, each of the third frame members 33 is disposed to be inclined in the vehicle 10 such that the rear side is declined downward, similarly to the first frame member 31.

As shown in FIGS. 3, 5, and 6, the fourth frame members 34 are disposed to bridge between the third frame members 33, and both ends are connected to the respective side surfaces of the third frame members 33. As shown in FIGS. 3 and 5, in the embodiment, the fourth frame members 34 are provided at positions closer to the rear side of the third frame members 33. As shown in FIG. 3, the second fuel cell unit 102 is disposed on the fourth frame member 34, and is fixed to the fourth frame members 34 by bolts, etc., via a battery mount (not shown). The fourth frame members 34 function as second fixing portions to which the second fuel cell unit 102 is fixed in the support frame 20.

In the embodiment, the first fixing portions configured of the second frame members 32 and the second fixing portions configured of the fourth frame members 34 are provided at positions offset from each other in a direction along the first frame members 31 and the third frame members 33. With this configuration, in the vehicle 10, the first fuel cell unit 101 and the second fuel cell unit 102 are mounted at positions offset in a front-rear direction of the vehicle 10, as shown in FIGS. 4 and 5. In the embodiment, the first fuel cell unit 101 and the second fuel cell unit 102 are supported by the support frame 20 at a position having a portion that overlaps with each other when viewed in the Z direction.

In the embodiment, the second frame portion 22 further includes a fifth frame member 35. The fifth frame member 35 is provided on the third frame members 33 so as to bridge between front end portions of the third frame members 33. The fifth frame member 35 suppresses distortion of the third frame members 33. The fifth frame member 35 may be omitted.

As shown in FIGS. 3, 4, and 6, the support frame 20 further includes a plurality of sixth frame members 36 that connect the first frame portion 21 and the second frame portion 22. The sixth frame member 36 functions as a connecting portion that connects the first frame portion 21 and the second frame portion 22 such that the second fuel cell unit 102 is located above the first fuel cell unit 101. Each of the sixth frame members 36 is provided to bridge, in the Z direction, between the first frame member 31 and the third frame member 33 arranged in an up-down direction. One end of each sixth frame member 36 is connected to the bottom surface of the first frame member 31, and the other end is connected to the upper surface of the third frame member 33. In the embodiment, the sixth frame members 36 are arranged in parallel with each other and are orthogonal to the first frame members 31 and the third frame members 33. A length of each of the sixth frame members 36 is longer than the height of the first fuel cell unit 101.

In the embodiment, the support frame 20 further includes a plurality of seventh frame members 37 that function as braces. The seventh frame member 37 is connected to the first frame member 31, the third frame member 33, and the sixth frame member 36 so as to intersect each of the first frame member 31, the third frame member 33, and the sixth frame member 36 diagonally. With the seventh frame members 37, distortion of the support frame 20 in the Y direction is suppressed. The seventh frame member 37 may be omitted.

In the support frame 20 of the embodiment, the strength of the frame members 33, 34 constituting the second frame portion 22 is lower than the strength of the frame members 31, 32 constituting the first frame portion 21. In the embodiment, metal materials having different strengths are used for the first frame portion 21 and the second frame portion 22 so as to generate the difference in strength as described above. In the embodiment, for example, the frame members 31, 32 of the first frame portion 21 are made of stainless steel, and the frame members 33, 34 of the second frame portion 22 are made of aluminum alloy. The reason why the strengths of the constituent members are changed between the first frame portion 21 and the second frame portion 22 will be described later. In the embodiment, the frame members 36, 37 constituting the portions other than the second frame portion 22 of the support frame 20 are made of a material having high strength similar to the material of the frame members 31, 32 constituting the first frame portion 21 as in the first frame portion 21.

As shown in FIGS. 4 to 6, the support frame 20 is fixed to the vehicle frames 15 of the vehicle 10 via the mounting portions 18 and the connecting members 19. Each of the mounting portions 18 is connected to the vehicle frame 15 of the vehicle 10. The connecting member 19 is a plate-shaped member connected to a lateral side of the support frame 20, and intervenes connection between the support frame 20 and the mounting portions 18. In the embodiment, the connecting member 19 is disposed along a front-rear direction of the vehicle 10 and is fixed to the sixth frame member 36 or the seventh frame member 37. Each of the mounting portions 18 is connected to the connecting member 19.

Each of the mounting portions 18 includes a buffer elastic member 18e made of a resin member such as an elastomer at a connecting portion with the connecting member 19. Elastic deformation of the buffer elastic member 18e reduces vibration during traveling of the vehicle 10 and an impact from the outside of the vehicle 10 transmitted to the support frame 20 and the fuel cell units 100 via the vehicle frame 15. In other embodiments, the buffer elastic member 18e may be configured of a metal spring. In the vehicle 10, a clearance is secured around the fuel cell units 101, 102 to allow displacement of the fuel cell units 101, 102 due to elastic deformation of the buffer elastic members 18e.

In the fuel cell assembly 200 according to the embodiment, the support frame 20 allows the first fuel cell unit 101 and the second fuel cell unit 102 to be mounted on the vehicle 10 via the common mounting portions 18. Therefore, the number of the mounting portions 18 in the vehicle 10 can be reduced, which is efficient. In the embodiment, the support frame 20 is connected to the mounting portions 18 in the vicinity of a central portion of the support frame 20 in a height direction thereof. With this configuration, a displacement width at an upper end portion and a lower end portion of the support frame 20 when the buffer elastic members 18e are elastically deformed is reduced. Therefore, the range in which the fuel cell units 101, 102 are displaced due to the elastic deformation of the buffer elastic members 18e is reduced.

In the fuel cell assembly 200 according to the embodiment, the first fuel cell unit 101 and the second fuel cell unit 102 are supported by the support frame 20 at positions displaced from each other in the height direction. With this configuration, the areas where the fuel cell units 101, 102 are disposed are suppressed from interfering with each other in the front-rear direction and the width direction of the vehicle 10. Therefore, a clearance that is enough to allow displacement of the fuel cell units 101, 102 due to the elastic deformation of the buffer elastic members 18e as described above can be secured in areas in front of, at the rear of, and on the right and left of the fuel cell units 101, 102. Further, a workspace for performing maintenance of the fuel cell units 101, 102 can be suppressed from interfering with each other in the front-rear direction and the width direction of the vehicle 10. Therefore, the workspace can be easily secured in front of, at the rear of, and on the right and left of the fuel cell units 101, 102. In addition, a distance between the fuel cell units 101, 102 in the X direction and in the Y direction can be reduced, while providing the areas for the fuel cell units 101, 102 including the clearance for allowing displacement of the fuel cell units 101, 102 and the workspace for performing maintenance of the fuel cell units 101, 102 as described above.

Now, FIG. 4 is referred. According to the fuel cell assembly 200 of the embodiment, the first fuel cell unit 101 and the second fuel cell unit 102 are disposed using the support frame 20 such that the first fuel cell unit 101 and the second fuel cell unit 102 overlap each other when viewed in the height direction of the vehicle 10. Therefore, enlargement of the areas where the two fuel cell units 101, 102 in the front-rear direction and the width direction of the vehicle 10 can be suppressed. Further, enlargement of the vehicle 10 in the front-rear direction and in the width direction of the vehicle 10 can also be suppressed.

In the support frame 20 according to the embodiment, the second frame portion 22 is located at the position away from the mounting portions 18 and above the vehicle frames 15 and the mounting portions 18. With this configuration, the impact transmitted through the vehicle frames 15 and the mounting portions 18 to the second frame portion 22 when, for example, a collision of the vehicle 10 occurs is reduced, compared to the impact transmitted to the first frame portion 21 that is disposed at a position closer to the vehicle frames 15 and the mounting portions 18. Therefore, the strength required for the second frame portion 22 is smaller than that of the first frame portion 21. The weight of the second frame portion 22 can be easily reduced by lowering the strength. Therefore, in the support frame 20 according to the embodiment, the strength of the frame members 33, 34 constituting the second frame portion 22 is lowered with respect to the strength of the frame members 31, 32 constituting the first frame portion 21, and the weight of the second frame portion 22 is reduced with respect to that of the first frame portion 21. With this configuration, in the support frame 20 according to the embodiment, the weight reduction as a whole is realized while suppressing deterioration of a protection performance of the fuel cell units 101, 102.

In the fuel cell assembly 200 according to the embodiment, the first fuel cell unit 101 and the second fuel cell unit 102 are supported at the positions offset in the front-rear direction of the vehicle 10. With this configuration, in the vehicle 10, a space facing each of the two fuel cell units 101, 102 created by the arrangement in which the fuel cell units 101, 102 are disposed at the positions offset from each other can be effectively used, for example, for installing auxiliary machines, etc., connected to the fuel cell units 101, 102 as described below.

In the vehicle 10 according to the embodiment, a first system auxiliary machine 120a is supported on the support frame 20 in an area behind the first fuel cell unit 101 and below the rear end side of the second fuel cell unit 102. The first system auxiliary machine 120a includes a compressor, a valve, and piping for supplying and discharging the reaction gas to and from the fuel cell units 101, 102. As described above, in the embodiment, the first pipe connecting portions 113 for the reaction gas are respectively provided on the rear end sides of the fuel cell units 101, 102. Therefore, when the first system auxiliary machine 120a is installed at the position described above, a piping distance between the first system auxiliary machine 120a and the fuel cell units 101, 102 can be shortened. Accordingly, the fuel cell system can be organized compactly.

In the vehicle 10 according to the embodiment, a second system auxiliary machine 120b is supported on the support frame 20 in an area above the first fuel cell unit 101 at the front end side thereof and in front of the second fuel cell unit 102. The second system auxiliary machine 120b includes a compressor, a valve, and piping for supplying and discharging the coolant to and from the fuel cell units 101, 102. As described above, in the embodiment, the second pipe connecting portions 114 for the coolant are respectively provided on the front end sides of the fuel cell units 101, 102. Therefore, when the second system auxiliary machine 120b is installed at the position described above, a piping distance between the second system auxiliary machine 120b and the fuel cell units 101, 102 can be shortened. Accordingly, the fuel cell system can be organized compactly.

In the fuel cell assembly 200 according to the embodiment, the support frame 20 is composed of a frame body in which the linear frame members 31 to 37 are connected as described above. In such a frame body, there are many clearances between the frame members 31 to 37. Therefore, the degree of freedom of a path for disposing the pipes and wirings connected to the fuel cell units 100 is increased. Further, an access by machines and tools when attaching such pipes, wirings, and various instruments to the fuel cell units 100 is facilitated.

Now, FIG. 2 is referred. In the vehicle 10 according to the embodiment, the fuel cell assembly 200 is mounted below the vehicle cabin 13 of the tractor head 11. The height of the tractor head 11 is higher than that of a normal vehicle such as a passenger car, and an area below the vehicle cabin 13 tends to have a relatively large height dimension such as an area under occupant seats. Therefore, with the tractor head 11, the fuel cell assembly 200 in which the two fuel cell units 101, 102 are disposed in the up-down direction can be installed easily.

As described above, with the support frame 20 according to the embodiment, the fuel cell units 101, 102 can be easily mounted on the vehicle 10 in a state where the fuel cell units 101, 102 are integrally and collectively disposed in two stages, that is, upper and lower stages. Further, the space inside the vehicle 10 can be effectively utilized while securing the necessary clearance around the fuel cell units 101, 102.

2. Other Embodiments

The various configurations described in the above embodiment can be modified as follows, for example. Each of the other embodiments described below are regarded as an example of modes for carrying out the technique of the present disclosure, like the above-described embodiment.

Other Embodiment 1

In the support frame 20 included in the fuel cell assembly 200 according to the above embodiment, the first frame portion 21 and the second frame portion 22 may be configured of plate-shaped members disposed in two stages, that is, upper and lower stages, instead of the linear frame members 31 to 34. Further, the first fixing portion to which the first fuel cell unit 101 is fixed may be configured by one or more plate-shaped members provided to bridge between the first frame members 31, instead of the second frame members 32. Further, the second fixing portion to which the second fuel cell unit 102 is fixed may be configured by one or more plate-shaped members provided to bridge between the third frame members 33, instead of the fourth frame members 34.

Other Embodiment 2

In the fuel cell assembly 200 according to the embodiment, the first fuel cell unit 101 and the second fuel cell unit 102 may not be supported at the positions offset in the front-rear direction of the vehicle 10. Further, the first fuel cell unit 101 and the second fuel cell unit 102 may be disposed so as not to have portions that overlap with each other when viewed in the height direction of the vehicle 10.

Other Embodiment 3

In the support frame 20 according to the above embodiment, one or more frame portions that support the fuel cell units 100 may be added above the second frame portion 22.

Other Embodiment 4

In the support frame 20 according to the above embodiment, the member constituting the first frame portion 21 and the member constituting the second frame portion may be made of the same type of metal, and may have the same strength and weight.

Other Embodiment 5

In the above embodiment, the support frame 20 may be installed above or below the vehicle frames 15. In this case, the connecting members 19 may be omitted, and the mounting portions 18 may directly support the first frame portion 21 from below or above the support frame 20. In the above embodiment, the support frame 20 may be fixed to a portion other than the vehicle frames 15, for example, a body of the vehicle 10 via the mounting portions 18.

Other Embodiment 6

The vehicle 10 is not limited to a freight vehicle including the tractor head 11 and the trailer 12. The vehicle 10 may be composed of a tractor head 11 alone, or may be composed of a freight vehicle in which a main body having a vehicle cabin and a cargo bed on which cargo is loaded are integrated. Further, the vehicle 10 does not have to be configured as a freight vehicle, and may be configured as, for example, an ordinary automobile.

3. Others

The technology of the present disclosure is not limited to the above-described embodiments, examples, and modifications, and can be implemented with various configurations without departing from the scope of the disclosure. For example, the technical features in the embodiments, examples, and modifications corresponding to the technical features in the aspects described in the summary of the disclosure may be appropriately replaced or combined in order to solve part of or all of the above-mentioned issues or in order to achieve part of or all of the above-mentioned effects. Further, not only the technical features that are described as non-essential in the specification but also other technical features may be appropriately omitted unless described as essential in the specification.

What is claimed is:

1. A fuel cell assembly mounted on a vehicle via a mounting support frame including a first mounting stage and a second mounting stage, the fuel cell assembly, comprising:
a first fuel cell that is fixed on the first mounting stage;
a second fuel cell that is fixed to the second mounting stage;
and
a plurality of connecting frame arms connecting the first mounting stage and the second mounting stage,
wherein the first fuel cell and the second fuel cell are disposed at positions offset from each other in a front-rear direction of the vehicle,
wherein the second mounting stage is provided at a position above the first mounting stage such that the second fuel cell is located above the first fuel cell, and
wherein the first fuel cell unit and the second fuel cell unit are supported so as to have portions that overlap each other when viewed in a height direction of the vehicle.

2. The fuel cell assembly according to claim 1, wherein:
a material strength of the second mounting stage is lower than a material strength of the first mounting stage.

3. A vehicle comprising the fuel cell assembly according to claim 1, wherein:
the vehicle is configured as a freight vehicle in which cargo is loaded behind a vehicle cabin in which a driver is on board; and
the fuel cell assembly is installed in an area below the vehicle cabin.

* * * * *